US009058482B2

(12) United States Patent  
Smith

(10) Patent No.: US 9,058,482 B2
(45) Date of Patent: Jun. 16, 2015

(54) CONTROLLING USER ACCESS TO ELECTRONIC RESOURCES WITHOUT PASSWORD

(75) Inventor: Fred Hewitt Smith, Old Town, ME (US)

(73) Assignee: ANGEL SECURE NETWORKS, INC., Old Town, ME (US)

(*) Notice: Subject to any disclaimer, the term of this patent is extended or adjusted under 35 U.S.C. 154(b) by 98 days.

(21) Appl. No.: 13/410,287

(22) Filed: Mar. 1, 2012

(65) Prior Publication Data

US 2012/0227092 A1 Sep. 6, 2012

Related U.S. Application Data

(60) Provisional application No. 61/447,774, filed on Mar. 1, 2011.

(51) Int. Cl.
G06F 21/00 (2013.01)
G06F 21/42 (2013.01)
H04L 29/06 (2006.01)
H04L 9/32 (2006.01)

(52) U.S. Cl.
CPC .............. G06F 21/42 (2013.01); H04L 63/107 (2013.01); H04L 9/3231 (2013.01)

(58) Field of Classification Search
CPC . G06F 21/42; H04L 2463/082; H04L 63/107; H04L 9/3231
USPC .......................................................... 726/4
See application file for complete search history.

(56) References Cited

U.S. PATENT DOCUMENTS 4,408,203 A 10/1983 Campbell
4,658,093 A 4/1987 Hellman
4,696,003 A 9/1987 Kerr et al.
(Continued)

FOREIGN PATENT DOCUMENTS

EP 0703531 3/1996
EP 0778512 6/1997

OTHER PUBLICATIONS

US 5,748,741, 05/1998, Johnson et al. (withdrawn).
(Continued)

Primary Examiner — Jeffrey Pwu
Assistant Examiner — Thong Truong
(74) Attorney, Agent, or Firm — Guntin & Gust, PLC; Ralph Trementozzi

(57) ABSTRACT

Described herein are devices and techniques for remotely controlling user access to a restricted computer resource. The process includes pre-determining an association of the restricted computer resource and computer-resource-proximal environmental information. Indicia of user-proximal environmental information are received from a user requesting access to the restricted computer resource. Received indicia of user-proximal environmental information are compared to associated computer-resource-proximal environmental information. User access to the restricted computer resource is selectively granted responsive to a favorable comparison in which the user-proximal environmental information is sufficiently similar to the computer-resource proximal environmental information. In at least some embodiments, the process further includes comparing user-supplied biometric measure and comparing it with a predetermined association of at least one biometric measure of an authorized user. Access to the restricted computer resource is granted in response to a favorable comparison.

14 Claims, 5 Drawing Sheets

(56) References Cited

U.S. PATENT DOCUMENTS

| | | | |
|---|---|---|---|
| 4,731,880 A | 3/1988 | Ault et al. | |
| 4,962,498 A | 10/1990 | May | |
| 4,999,806 A | 3/1991 | Chernow et al. | |
| 5,001,755 A | 3/1991 | Skret | |
| 5,005,122 A | 4/1991 | Griffin et al. | |
| 5,023,907 A | 6/1991 | Johnson et al. | |
| 5,155,847 A | 10/1992 | Kirouac et al. | |
| 5,247,683 A | 9/1993 | Holmes et al. | |
| 5,301,247 A | 4/1994 | Rasmussen et al. | |
| 5,317,744 A | 5/1994 | Harwell et al. | |
| 5,388,211 A | 2/1995 | Hornbuckle | |
| 5,416,842 A | 5/1995 | Aziz | |
| 5,421,009 A | 5/1995 | Platt | |
| 5,438,508 A | 8/1995 | Wyman | |
| 5,452,415 A | 9/1995 | Hotka | |
| 5,495,610 A | 2/1996 | Shing et al. | |
| 5,509,070 A | 4/1996 | Schull | |
| 5,509,074 A | 4/1996 | Choudhury et al. | |
| 5,548,649 A | 8/1996 | Jacobson | |
| 5,594,866 A | 1/1997 | Nugent | |
| 5,638,512 A | 6/1997 | Osman et al. | |
| 5,671,279 A | 9/1997 | Elgamal | |
| 5,706,507 A | 1/1998 | Schloss | |
| 5,708,709 A | 1/1998 | Rose | |
| 5,708,780 A | 1/1998 | Levergood et al. | |
| 5,710,883 A | 1/1998 | Hong et al. | |
| 5,732,275 A | 3/1998 | Kullick et al. | |
| 5,737,706 A | 4/1998 | Seazholtz et al. | |
| 5,748,896 A | 5/1998 | Daly et al. | |
| 5,826,014 A | 10/1998 | Coley et al. | |
| 5,864,747 A | 1/1999 | Clark et al. | |
| 5,909,589 A | 6/1999 | Parker et al. | |
| 5,974,250 A | 10/1999 | Angelo et al. | |
| 6,067,582 A | 5/2000 | Smith | |
| 6,324,647 B1 | 11/2001 | Bowman-Amuah | |
| 6,532,543 B1 | 3/2003 | Smith | |
| 6,668,325 B1 | 12/2003 | Collberg et al. | |
| 6,842,862 B2 | 1/2005 | Chow et al. | |
| 6,918,038 B1 | 7/2005 | Smith | |
| 7,117,535 B1 | 10/2006 | Wecker | |
| 7,124,445 B2 | 10/2006 | Cronce et al. | |
| 7,149,308 B1 | 12/2006 | Fruehauf et al. | |
| 7,170,999 B1 | 1/2007 | Kessler et al. | |
| 7,233,948 B1 | 6/2007 | Shamoon et al. | |
| 7,328,453 B2 | 2/2008 | Merkle et al. | |
| 7,370,360 B2 | 5/2008 | Van der Made | |
| 7,865,937 B1* | 1/2011 | White et al. | 726/2 |
| 7,913,305 B2 | 3/2011 | Bodorin et al. | |
| 7,991,388 B1* | 8/2011 | Becker et al. | 455/411 |
| 2003/0126457 A1 | 7/2003 | Kohiyama et al. | |
| 2003/0188187 A1 | 10/2003 | Uchida | |
| 2003/0212902 A1 | 11/2003 | Van der Made | |
| 2003/0221121 A1 | 11/2003 | Chow et al. | |
| 2003/0236986 A1 | 12/2003 | Cronce et al. | |
| 2004/0111613 A1 | 6/2004 | Shen-Orr et al. | |
| 2005/0097441 A1 | 5/2005 | Herbach et al. | |
| 2006/0005250 A1 | 1/2006 | Chu | |
| 2006/0005252 A1 | 1/2006 | Chu et al. | |
| 2006/0095790 A1* | 5/2006 | Nguyen et al. | 713/186 |
| 2007/0234070 A1 | 10/2007 | Horning et al. | |
| 2007/0252001 A1* | 11/2007 | Kail et al. | 235/380 |
| 2009/0237203 A1* | 9/2009 | Determan et al. | 340/5.52 |
| 2011/0001606 A1* | 1/2011 | Charych | 340/5.7 |
| 2012/0094598 A1* | 4/2012 | Tysowski | 455/41.1 |

OTHER PUBLICATIONS

"Set Tool Kit for Secure Commerce", Bank Systems +Technology, p. 16, May 1996.

"Software Taps Net for Supply Data Sharing", Electronic Buyers News, Section: Purchasing, p. 50, Apr. 22, 1996.

Arnow, "DP: A Library for Building Portable, Reliable Distributed Applications", USENIX Tech Conf, pp. 235-247, Jan. 16-20, 1995.

Baentsch et al., "WebMake: Integrating Distributed Software Development in a Structure-enhanced Web", Computer Networks and ISDN Systems 27, pp. 789-800, 1995.

Bernstein, "Let's Talk: Interapplication Communications in C++ Using X Properties", The X Journal, pp. 37-44, Jan. 2, 1996.

Bryant, "Am I Bid Six? Click to Bid Six!", The New York Times, Section D1, May 13, 1996.

Chii-Ren Tsai et al., Distributed Audit with Secure Remote Procedure Calls, pp. 154-160, XP000300426, Oct. 1991.

Chris Jones, "Licensing Plan Flows from Stream", Infoworld, Section: News, May 6, 1996.

D. Trommer, "ECS Catalog Merges EDI/Net Platforms, Electronic Buyers News", Section: Purchasing, p. 54, May 20, 1996.

Dagenais et al., "LUDE: A Distributed Software Library", USENIX Tech Conf, pp. 25-32, Nov. 1-5, 1993.

DellaFera et al, "The Zephyr Notification Service", USENIX Winter Conference, Feb. 9-12, 1988.

Diane Trommer, "GE/Netscape Form Software Venture", Electronic Buyers News, Section: Online @EBN, p. 54, Apr. 22, 1996.

Eirich, "Beam: A Tool for Flexible Software Update", USENIX Tech Conf, pp. 75-82, Sep. 19-23, 1994.

Ellen Messmer, "Active X Pioneer Pushes Commerce", Network World, p. 33, May 6, 1996.

Flohr "Electric Money", BYTE, pp. 74-84, 1996.

Lodin, "The Corporate Software Bank", USENIX Tech Conf, pp. 33-42, Nov. 1-5, 1993.

M. Takahata et al., Real-Time Video-On-Demand System based on Distributed Servers and an Agent-Oriented Application, vol. 2663, 31 pp. 242-251, Jan. 1996.

Maeda et al., "Service without Servers", IEEE, 4m IEEE Workshop on Workstation Operating Systems, pp. 170-176, Aug. 1, 1993.

Marshall, "Banking on the Internet", Communications Week, p. 1, May 20, 1996.

Messmer, "Edify Software to Let Banks Open Doors Online", Network World, p. 16, May 20, 1996.

Messmer, "Start-up puts security SOCKS on Windows apps", NE, 39, May 20, 1996.

Michael B. Jones, "Interposition Agents: Transparently Interposing User Code at the System Interface", 14th ACM Symposium on Operating Systems Principals, pp. 80-93, 1993.

Nachbar, "When Network File Systems Aren't Enough: Automatic Software Distribution Revisited", USENIX Tech. Conf., pp. 159-171, Summer 1986.

Nash et al., "Vendors Deliver IS-specific apps over the 'net'", Computer World, Section: News, p. 16, May 6, 1996.

Noble et al., "A Programming Interface for Application-Aware Adaptation in Mobile Computing", USENIX Association, vol. 8, No. 4, pp. 345-363, Fall 1995.

One Click Software Via the Web, Datamation, p. 16, May 1, 1995.

Ozer, Online Software Stores, PC Magazine, Section: Trends, p. 36, May 28, 1996.

Rodriguez, "Pushing the Envelope", Communications Week, Section: Internet/ Internet, p. 37, May 31, 1996.

Rupley, "Digital Bucks? Stop Here", PC Magazine, Section: First Looks, p. 54, May 28, 1996.

Semilof, "Boosting Web Business", Communications Week, Section: News Brief, p. 31, May 20, 1996.

Silwa, "Netscape Unveils New 'New Commerce Offerings", Networld World, Section: Internet News, p. 10, May 13, 1996.

Stream International Inc., Stream, LitleNet, BBN, and KPMG Announce Industry-Wide Initiative to Enable Wide-Scale Software Electronic Commerce, http://www.stream.com, May 12, 1996.

Tim Clark, "The Big Sell, Software Online", Inter@ctive Week, pp. 31-35, Apr. 22, 1996.

Turoff et al, "An Electronic Information Marketplace", North Holland Computer Networks and ISDN Systems 9, pp. 79-90, 1985.

Wexler, "AT&T Sells Insurers on the Web", Network World, p. 27, May 20, 1996.

Wong, "Local Disk Depot-Customizing the Software Environment", USENIX Tech Conf, pp. 51-55, Nov. 1-5, 1993.

Yamada et al, "Electronic Distribution Program on tap", Computer Reseller News, pp. 1 and 169, Apr. 29, 1996.

\* cited by examiner

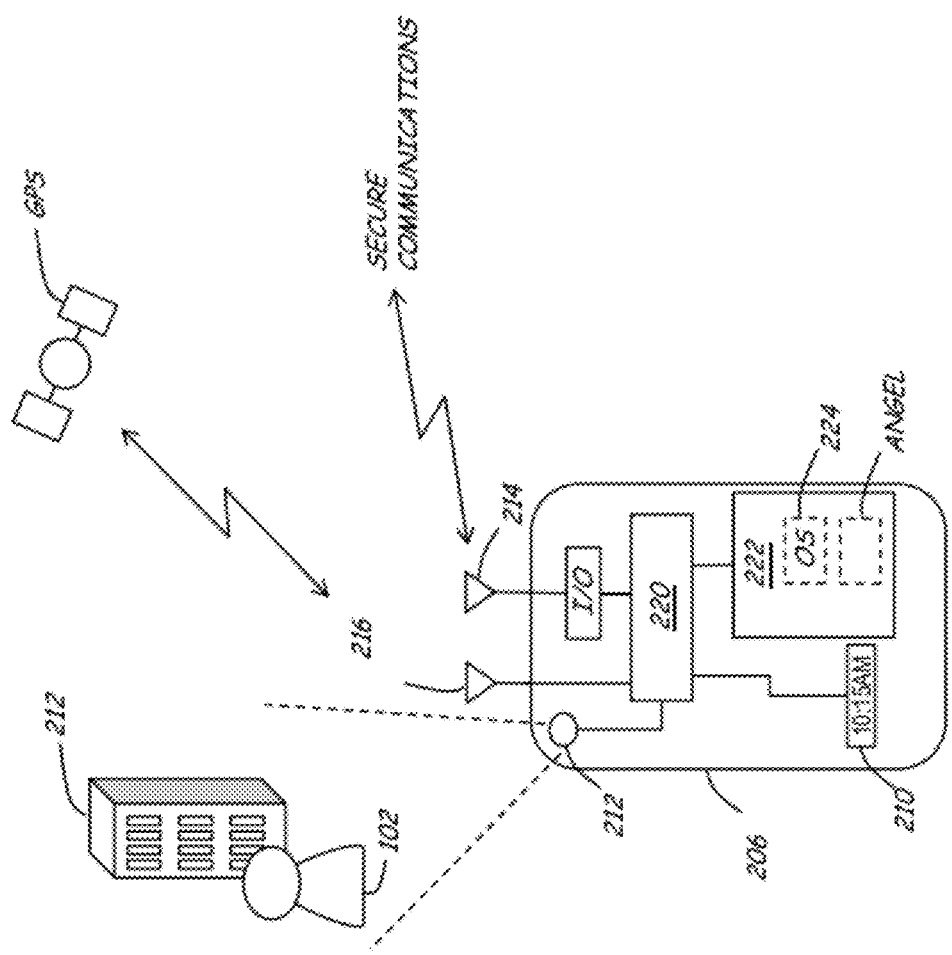

CONTROLLING USER ACCESS TO ELECTRONIC RESOURCES WITHOUT PASSWORD

RELATED APPLICATIONS

This application claims priority to U.S. Provisional Patent Application No. 61/447,774, filed on Mar. 1, 2011. The entire teachings of the provisional application are incorporated herein by reference.

STATEMENT OF GOVERNMENT RIGHTS

This invention was made with Government support under Grant No. DE-FG02-08ER5047 awarded by the Department of Energy. The Government may have certain rights in this invention.

TECHNICAL FIELD

This application relates generally to the field of computer security. More particularly, this application relates to the technology of computer access control.

BACKGROUND

User access to restricted computer resource, such as computing devices and/or applications, generally requires some sort of user-initiated authorization code. A common example of such a code is an alphanumeric password. Such passwords may be used to log into a computer, and or an application or remote service.

As threats to sensitive, proprietary and personal information become greater with the increase in rise of cyber attacks, there is a greater need for such measures of protection. As adversaries become more sophisticated at cracking or otherwise obviating such passwords, there is an even greater need for using longer and more complex passwords (e.g., not simply words or phrases). Not only are long and complex codes becoming the norm, but the prescribed frequency at which such codes must be changes is also increasing.

As users of such computer resources generally have to remember more than one such password at any given time, the burden to users can be problematic. Unfortunately, users may be tempted to write such codes down, or even worse, save them in an electronic format. This may be the only way to keep track of multiple complex passwords. The availability of such sensitive information in a tangible form only increases the possibility that such information will be compromised. Moreover, user of a password alone does not provide any assurance that the user submitting the password is actually the authorized user.

SUMMARY

What is needed is a capability that provides an authorized user with an ability to provide sufficient evidence to prove identity and perhaps other factors, without a need for such complicated password.

Described herein are embodiments of systems of useable security that do not involve passwords. The example systems and architectures described herein use security assurances that involve systems that are generally referred to as "orthogonal," that is, unrelated, to the system for which a password might be requested. Such systems are generally referred to herein as No Password Orthogonal Authentication of Humans (NOAH), and the type of authentication as orthogonal authentication. Orthogonal authentication has been the study of the Applicant for several years and has demonstrated such types of authentication in the context of authenticating operations on Beowulf clusters of computers. Problems encountered in implementing orthogonal authentication until now have been primarily related to the cost and the technical complexity of integrating equipment into the login process that was truly orthogonal to the equipment being logged into. However, inexpensive commercial-off-the-shelf (COTS) equipment has appeared on the market which now potentially makes orthogonal authentication inexpensive and low cost.

Examples of such new equipment include technologies and products referred to generally as "smart-phone," such as the NEXUS S smart-phone, commercially available from Samsung Electronics, Samsung Town, Seoul, South Korea. The Nexus S runs the ANDROID operating system and is capable of communicating via the Global System for Mobile Communications (GSM) cell phone network, Wi-Fi, Bluetooth, and USB. The NEXUS S also implements Near Field Communications (NFC) technology. The Nexus S also has a GPS receiver, a compass, an accelerometer, and back and forward facing cameras. In a very small and relatively inexpensive device, the smart-phone, particularly the NEXUS S, brings together multiple communications technologies combined with multiple biometric technologies.

Using the smart-phone there are many possibilities for logging in without using a password. The questions are whether these methods are (a) secure and (b) useable. The security question is whether these login methods can be overcome by a capable adversary. The usability question revolves around whether the methods are easily useable by individuals who wish to log in and easily useable by organizations who wish to restrict access to a machine or to an application.

In one aspect, at least one embodiment described herein provides a process for remotely controlling user access to a restricted computer resource. The process includes pre-determining an association of the restricted computer resource and computer-resource-proximal environmental information. Indicia of user-proximal environmental information are received from a user requesting access to the restricted computer resource. Received indicia of user-proximal environmental information are compared to associated computer-resource-proximal environmental information. User access to the restricted computer resource is selectively granted responsive to a favorable comparison in which the user-proximal environmental information is sufficiently similar to the computer-resource proximal environmental information.

In at least some embodiments, the process further includes predetermining an association of at least one biometric measure with an authorized user. At least one user-supplied biometric measure is received from the user requesting access to the restricted computer resource. The at least one user-supplied biometric measure is compared with the at least one associated biometric measure. The act of granting includes granting selectively user access to the restricted computer resource responsive to a favorable comparison in which (i) the user-proximal environmental information is sufficiently similar to the computer-resource proximal environmental information and (ii) the at least one user-supplied biometric measure is sufficiently similar to the at least one associated biometric measure.

In yet another aspect, at least one embodiment described herein provides a system remotely controlling user access to a restricted computer resource. The system includes a memory storing a pre-determined association of the restricted computer resource and computer-resource-proximal environmental information and a predetermined association of at least one biometric measure with an authorized user. The system also includes a multi-function user communication device adapted to obtain indicia of user-proximal environmental information. A login processor is provided in communication with the multi-function user communication device and the memory. The login processor adapted to: (i) compare the at least one user-supplied biometric measure with the at least one associated biometric measure; (ii) compare the user-proximal environmental information with the associated computer-resource-proximal environmental information; and (iii) selectively grant user access to the restricted computer resource responsive to a favorable comparison in which (a) the user-proximal environmental information is sufficiently similar to the computer-resource proximal environmental information and (b) the at least one user-supplied biometric measure is sufficiently similar to the at least one associated biometric measure.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 shows a schematic diagram of an embodiment of a multi-function personal communication device adapted for enabling a remote secure login capability.

DESCRIPTION OF THE DISCLOSURE

Figure 1A:
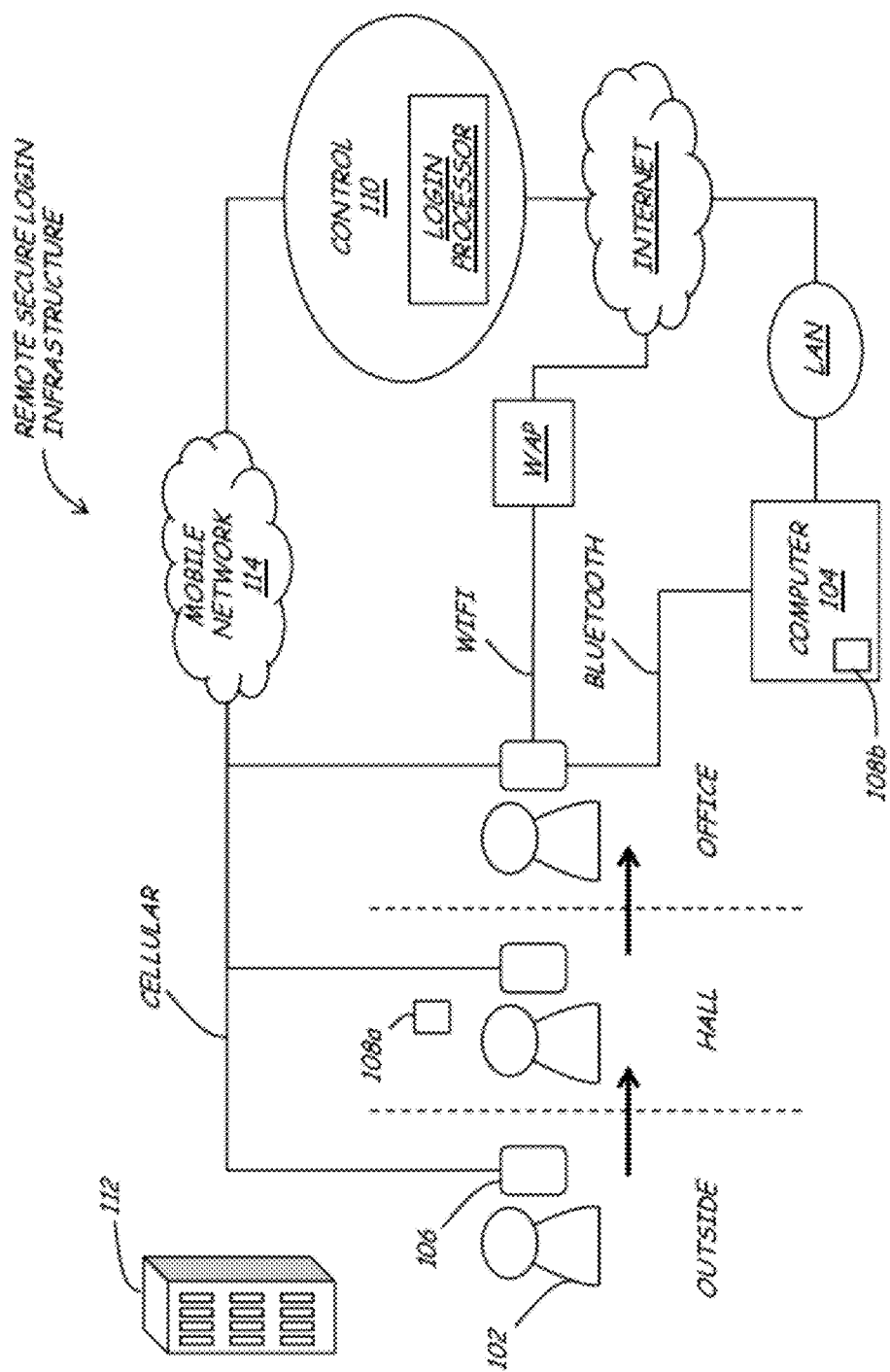
FIG. 1A presents a functional block diagram of an embodiment of an infrastructure providing a remote secure login capability.

In the following detailed description of the preferred embodiments, reference is made to accompanying drawings, which form a part thereof, and within which are shown by way of illustration, specific embodiments, by which the invention may be practiced. It is to be understood that other embodiments may be utilized and structural changes may be made without departing from the scope of the invention.

The particulars shown herein are by way of example and for purposes of illustrative discussion of the embodiments of the present disclosure only and are presented in the case of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in that how the several forms of the present invention may be embodied in practice. Further, like reference numbers and designations in the various drawings indicate like elements.

The approaches described herein directly address how to avoid using passwords. Since passwords can be easily stolen and often written down to avoid loss, the NOAH procedure is more secure. Moreover, the approach is widely applicable and relatively inexpensive. NOAH addresses human engineering issues to facilitate wide adoption by ensuring it is easily usable by humans. In some applications, a picture is a much better biometric than a finger print or iris scan. For example, it generally requires a computer to detect whether a finger print or iris scan belongs to an individual, e.g., Bob. Any person who knows Bob has some idea whether a picture of an individual is Bob. If the person can compare the picture with the file photo, the person can have very good idea whether the man in the picture is Bob, even without prior acquaintance with Bob. There are also automated ways of determining whether the picture is the picture of Bob. However, if the man in the picture is not Bob, the picture helps identify the evil doer (i.e., intruder) who is posing as Bob and will also identify the surroundings. The Nexus S platform has a 5 megapixel camera. This is a much higher resolution photo than a bank photo that is automatically taken of the teller line every few seconds. Accordingly, the greater resolution captures the individual with greater fidelity enabling comparison of subtle features.

In at least some embodiments, Distributed ANGEL Secure Content Delivery and Host authentication (DASH) technology can be run on one or more of the smart-phone, the desktop where an individual is logging in, and in the control room, which manages the login. DASH technology incorporates aspects described in one or more of U.S. Pat. Nos. 6,532,543 and 7,841,009 attached hereto and incorporated herein by reference in their entireties. DASH uses agent executables (ANGELS), which set up a secure network among themselves. All communications are encrypted with keys that are established just-in-time before they are needed. A network of ANGELS is designed with the primary goal of being very difficult to reverse engineer and to be able to detect reverse engineering attempts against whatever critical information the ANGEL is protecting. In addition, a network of ANGELS can be used to perform various security functions, such as secure delivery of cryptographic materials and secure identification of remote processes based on hardware and other values. DASH can be used to securely identify remote processes and to download and run applications on remote processor.

In at least some embodiments, DASH technology is used to securely set up the smart-phones before they are issued to employees and, in at least some instances, to reimage the smart-phones periodically. For example, while Bob is using the smart-phone to communicate with control, DASH would be examining the smart-phone to determine whether it had been compromised and to collect information of which the user (i.e., Bob) will be unaware. The smart-phone continues to communicate over the cell phone network even when Bob is not using it. No critical information is stored on the smart-phone itself. All communication between the smart-phone and control and the smart-phone and the target login hardware is encrypted by DASH software. Such a procedure generally will defeat keyboard sniffers and screen sniffers. Keyboard sniffer and screen sniffers represent a major security threat to password logins.

Referring a first to scenario illustrated in FIG. 1A, a user 102 (Bob) logs into his desktop computer 104 at his office. The company also issues Bob a multi-feature mobile communication device, or smart-phone 106, on which an embodiment of NOAH has automatically configured with appropriate applications. In the illustrative example, the company places an identifying tag, such as a near field communication (NFC) tag 108b on Bob's desktop and another NFC tag 108a the hallway. There is a central control facility 110 that can communicate with Bobs smart-phone 106 and his desktop computer 104. Continuing with the example, Bob arrives at his place of work. Using his smart-phone 106, he takes a picture of himself 102 outside of the building using an environmental feature, such as the building itself as a landmark 112. The smart-phone 106 obtains other indicia of the user-proximal environment, such as local GPS coordinates and a time stamp and sends these items to control 110 over the cell phone data network 114, as shown.

As Bob enters the hallway, inside the building 112 he swipes the NFC tag 108a. In his office, he swipes the NFC tag 108b on his desktop computer 104, and may also take a photo of himself 102 and his desktop computer 104. The smart-phone 106 sends information obtained from the tag 108a, 108b, any photo and associated timestamp to control 110, again via the cell phone data network 114, as shown.

Control 110 obtains a confirmation of a comprehensive network path, for example by pinging itself following a communication path along the cell phone network 114 to the smart-phone 106, then via a personal area network (e.g., Bluetooth) from the smart-phone 106 to the desktop computer 104, then from the desktop computer 104 back to control 110. Control 110 is able to establishing from the results of such a comprehensive network path confirmation that Bob is within Bluetooth range of the target login machine (i.e., desktop computer 104). Assuming that control 110 determines everything is reasonable in view of information obtained from Bob's smart phone 106 and/or the network confirmation, control 110 logs Bob into one or more application(s) that he requires, which subsequently appear on his desktop.

In the illustrative example, Bob has obtained access to restricted computer resources, including his desktop computer 104 and one or more applications appearing on his desktop, without having entered a single password nor does he need to know a password. Beneficially, NOAH installs applications on the smart-phone 106 to securely communicate with control 110 via encrypted messages and to test that the smart-phone 106 has not been compromised. All Bob does, in this example, is run these applications, take some pictures, and swipe some tags. If anything appears out of order (say it is 3:00 AM) control 110 has the option of placing a voice call to Bob on Bob's smart-phone 106 phone. Someone at control 110 could then speak with Bob in order to obtain further assurances (e.g., voice print comparison of Bob's voice, Bob's response(s) to question(s)) that all is in order.

Figure 1B:
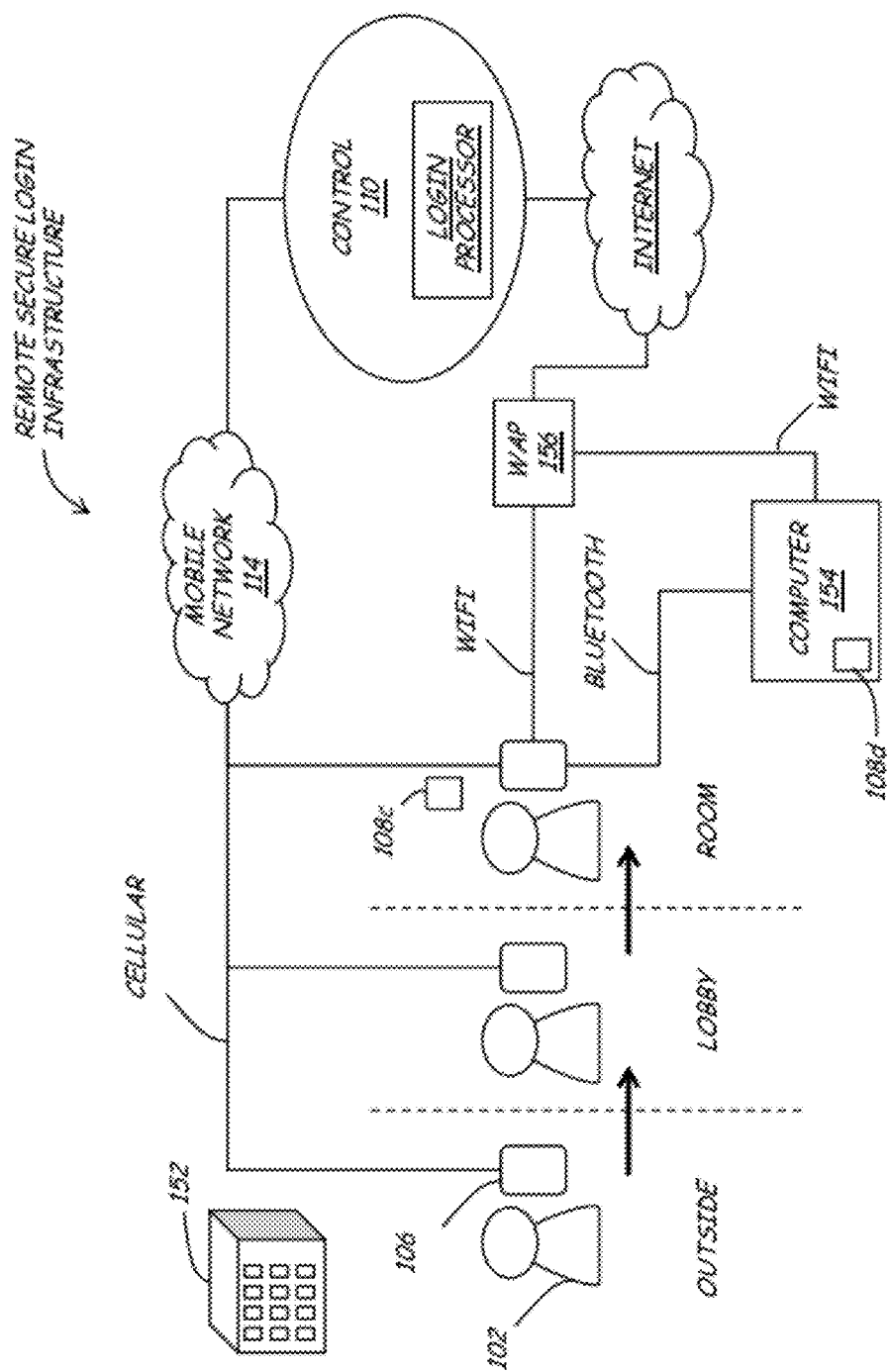
FIG. 1B presents a functional block diagram of another embodiment of an infrastructure providing a remote secure login capability.

An alternative scenario is illustrated in FIG. 1B. This scenario refers to a situation in which Bob logs into an application from a remote location, such as a hotel room. When Bob arrives at the hotel 152, he uses the smart-phone 160 to again take a picture of himself outside the hotel entrance 152. The phone 106 obtains a GPS reading and a time stamp, all of which the smart-phone 106 sends to control via the cell phone data network 114.

Presumably control 110 already knows where Bob is supposed to be staying. Before leaving, control 110 could have mailed an NFC tag 108c to the hotel or could have emailed a tag to the hotel, which the smart-phone 106 can read with its camera. When Bob arrives in his hotel room, his laptop 154 will have a tag 108d supplied by the company. In at least some instances, the company may have a rule that all access from outside company property to sensitive material requires a personal telephone call from control 110 to the person 102 requesting such access. This scenario is basically the same as the previous scenario illustrated in FIG. 1A, except that communication between the laptop computer 154 and control 110 is via the hotel's Wi-Fi. Namely, the laptop computer 154 connects via WiFi to a wireless access point (WAP) 156 at the hotel. The hotel provides connectivity to the Internet, which can be used to reach control 110.

All communication between Bob's smart-phone 106 and control 110, and between Bob's laptop computer 154 and control 110, and between Bob smart-phone 106 and his laptop computer 154 can be encrypted, for example, using a security scheme, such as DASH technology. In at least some embodiments, Bob can be provided with a secret panic alarm that he can covertly activate.

In yet another example scenario (not shown), Bob logs into an application from home. Now the company has issued NFC tags that Bob sticks in his home and on his home computer. Bob steps outside to take a GPS reading. If security requires, control has the option of calling Bob on his smart-phone 106 and talking to him and optionally looking at his surroundings (e.g., through the smart-phone's camera).

A DASH software can be run on one or more of the smart-phones, the control room, and the desktops or laptops for which login are required. The smart-phone uses one or more of its many capabilities (e.g., camera, position sensors, clock) to gather information about the scenario. Control authorizes the logins on the target desktop or laptop. Control could authorize logins not only for access to the desktop or laptop but also for access from the laptop to multiple other applications that are running remotely. As a result the individual authorized by NOAH could log into multiple applications without having to know the different passwords the applications might require.

FIG. 2 shows a schematic diagram of an embodiment of a multi-function personal communication device, such as a smart phone 206 adapted for enabling a remote secure login capability. The smart phone 206 includes a camera 208, as may be used to obtain an image of the user 102 in proximity to an identifiable landmark 212. The camera 208 can be a still camera and/or a video camera that might capture sound as well as images. The smart phone 206 also includes a time reference 210, such as an internal calendar and clock, as may be used to time stamp user-proximal environmental information. The smart phone 206 also includes a wireless communication capability 214 for communicating with a wireless mobile communications (e.g., cellular) network, and a location sensor, such as one or more of a GPS receiver 216 and a compass.

The smart phone 206 also includes at least one processor 220 in communication with one or more of the various features 210, 212, 214, 216, and an electronically readable memory 222. In at least some embodiments, the memory 222 stores a number of pre-programmed instructions for execution by the processor 220. The instructions can be related to one or more of an operating system 221 (e.g., ANDROID) and other applications. As illustrated, the memory can also include one or more agents, such as the ANGELs described herein, to facilitate communications with external entities using a secure means of communications (e.g., encryption).

Figure 3:
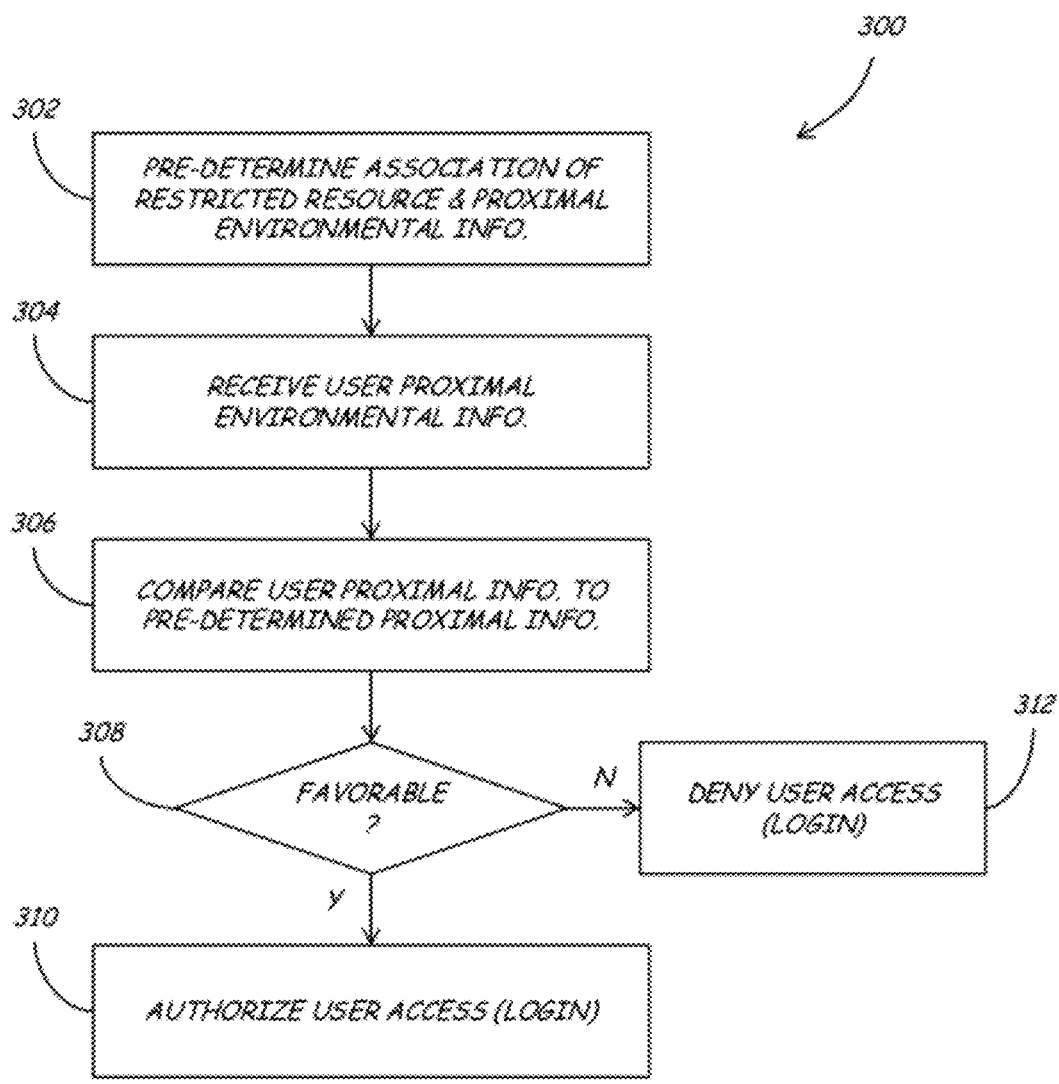
FIG. 3 shows a flow diagram of an embodiment of a process for controlling remote secure login.

FIG. 3 shows a flow diagram of an embodiment of a process 300 for controlling remote secure login. An association of a restricted resource (e.g., a user's workstation, laptop and/or applications) and proximal environmental information is predetermined at 302. Examples of environmental information can include photographs indicative of a location (e.g., an office building, a laboratory, a hotel), geo-location information, such as GPS coordinates, proximity to a tag, such as an NFC tag, and the like. User-proximal environmental information is received at 304, and corresponds to user provided information, which may include indicia of the user, such as an image, voice print, and the like. The user-proximal information is compared to the pre-determined proximal information at 306. Based on an unfavorable comparison at 308, user access (login) is denied at 312. Based on a favorable comparison at 308, however, user access (login) is authorized at 310.

Figure 4:
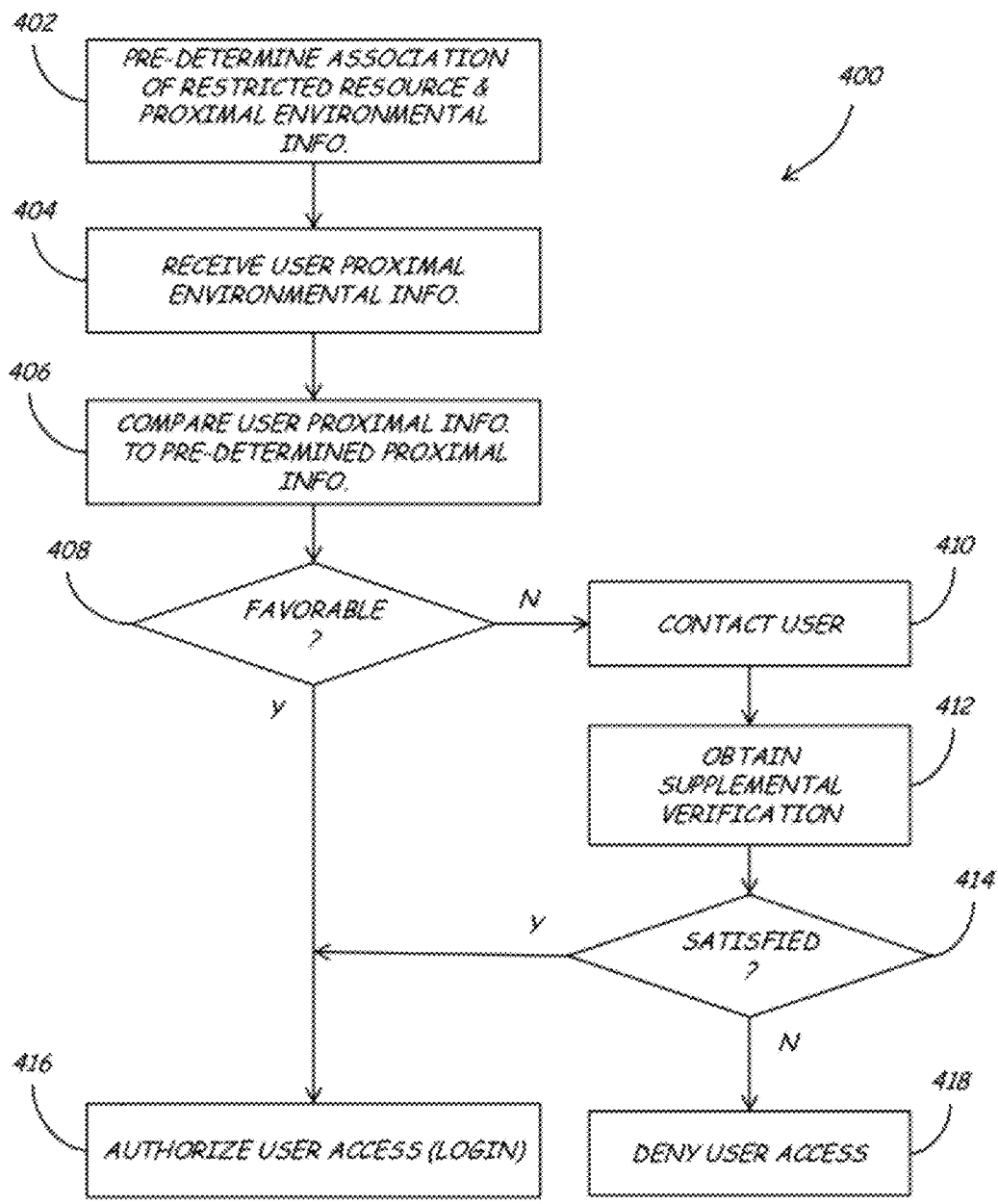
FIG. 4 shows a flow diagram of another embodiment of a process for controlling remote secure login.

FIG. 4 shows a flow diagram of another embodiment of a process 400 for controlling remote secure login. An association of restricted resource and proximal environmental information is predetermined at 402. User-proximal environmental information is received at 404. The user-proximal information is compared to the corresponding pre-determined proximal information at 406. Based on an unfavorable comparison at 408 an access controller can contact the user at 410 (e.g., by a voice call) and obtain supplemental verification at 412 (e.g., voiceprint and/or answer(s) to security question(s)). Based on the controller being satisfied with the user responses at 414, user access (e.g., permit login) is authorized at 416. Otherwise, user access is denied at 418.

The user desiring access does not enter passwords, so there is no need to know passwords. Smart-phones are inexpensive and readily available with powerful capabilities to integrate multiple communication channels. The smart-phone can be automatically configured before use. DASH technology provides secure encrypted communication between smart-phone, control, desktops, and laptops. The NOAH system can be tailored to the scenario and the requirements of the employee user and the requirements of the company.

NOAH allows a control facility to automatically manage an individual's (e.g., Bob in the above examples) to login to his office PC. Outside of the office building, Bob uses smart-phone to send GPS, photo of himself, & timestamp to control. Inside, for example in the hall, Bob swipes tag with NFC on phone, takes another photo, sends photo, NFC info, timestamp to control; inside his office, ditto, and communicates with PC via Bluetooth. PC is connected over Internet to control. If there is a problem, supervisor can talk to Bob on his phone.

Bob does not need to type in password to login. Scenarios for protecting and otherwise gaining access to networked assets, such as those described herein, can be referred to as multi-factor, multi-path authentication. Bob swipes cards, pushes buttons to log in. NOAH can be configured to defeat keyboard sniffers and screen sniffers. In at least some embodiments, NOAH can be used to securely provide passwords for multiple outside applications. In some embodiments, applications are added to a smart-phone to communicate securely with control.

ANGEL DASH technology has been implemented on several DoD boards with on-going efforts with second-tier primes to introduce DASH into deployed systems In some embodiments, a user can complete a login with less than about 1 minute of added time.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present disclosure.

While the present disclosure has been described with reference to example embodiments, it is understood that the words, which have been used herein, are words of description and illustration, rather than words of limitation. Changes may be made, within the purview of the appended claims, as presently stated and as amended, without departing from the scope and spirit of the present disclosure in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. A method of remotely controlling user access to a restricted computer resource, comprising:

pre-determining, by a device comprising a processor, an association of the restricted computer resource and computer-resource-proximal environmental information;

receiving, by the device, from a user requesting access to the restricted computer resource, indicia of user-proximal environmental information;

comparing, by the device, the indicia of user-proximal environmental information to associated computer-resource-proximal environmental information;

granting, by the device, selectively user access to the restricted computer resource responsive to the comparing of the indicia of the user-proximal environmental information in which the user-proximal environmental information corresponds to the computer-resource-proximal environmental information;

pre-determining, by the device, an association of a biometric measure with an authorized user;

receiving, by the device, from the user requesting access to the restricted computer resource a user-supplied biometric measure;

comparing, by the device, the user-supplied biometric measure with the associated biometric measure, wherein granting comprises granting selectively user access to the restricted computer resource responsive to the comparing of the indicia of the user-proximal environmental information in which:

(i) the user-proximal environmental information corresponds to the computer-resource-proximal environmental information; and (ii) the user-supplied biometric measure corresponds to the biometric measure;

contacting, by the device, the user responsive to the comparing of the user-supplied biometric measure in which one of the user-proximal environmental information does not correspond to the computer-resource-proximal environmental information, the user-supplied biometric measure or a combination thereof corresponds to the associated biometric measure;

obtaining, by the device, supplemental user-supplied information;

interpreting, by the device, the supplemental user-supplied information;

granting selectively, by the device, user access to the restricted computer resource responsive to the interpreting of the supplemental user-supplied information; and securing, by the device, a transfer of the supplemental user-supplied information, wherein securing comprises application of a software agent to establish such secure communications, wherein the software agent is associated with a plurality of networked software agents to collectively detect and deter attempted reverse engineering and to securely examine a state of the device.

2. The method of claim 1, wherein the user-supplied biometric measure comprises an identifiable feature of the user.

3. The method of claim 2, wherein the user-proximal information comprise a user-obtained image comprising the user-supplied biometric measure in juxtaposition with an identifiable feature of a user-proximal environment.

4. The method of claim 1, wherein the computer-resource-proximal environmental information comprises a geo-location.

5. The method of claim 1, wherein the computer-resource-proximal environmental information comprises an identifiable landmark.

6. The method of claim 1, wherein the computer-resource-proximal environmental information comprises a pre-configured identification tag.

7. The method of claim 6, wherein the pre-configured identification tag is selected from the group consisting of a serial number, a bar code, a QR code, a radio frequency identification tag, a near field communication-readable tag and combinations thereof.

8. The method of claim 1, wherein the supplemental user-supplied information comprises one of a voice print, a user-response to a query or a combination thereof.

9. The method of claim 1, wherein the restricted computer resource comprises one of a workstation, an application, or a combination thereof.

10. The method of claim 1, wherein securing of the transfer of the supplemental user-supplied information, comprises encrypting all communications according to encryption keys that are established just-in-time before they are needed.

11. The method of claim 1, further comprising detecting, by the software agent, an attempted reverse engineering.

12. The method of claim 1, wherein the device comprises a smart-phone.

13. The method of claim 1, further comprising reimaging software of the device by the software agent associated with the plurality of networked software to detect an attempt at reverse engineering.

14. The method of claim 1, further comprising securing the device by examining one of device software, operating system or both during one of a power charging of the device, or before use of the device, by the software agent associated with a plurality of networked software agents, to detect reverse engineering and conduct examinations of the device from the plurality of networked software agents.

* * * * *